United States Patent
Heron

[11] 3,979,075
[45] Sept. 7, 1976

[54] MACHINES FOR CUTTING WOOD AND OTHER LIGNEOUS MATERIALS INTO SMALL PIECES

[75] Inventor: Pierre D. Heron, Nogent sur Marne, France

[73] Assignee: Centre Technique du Bois, France

[22] Filed: July 3, 1974

[21] Appl. No.: 485,753

[30] Foreign Application Priority Data
July 5, 1973 France .................... 73.24796

[52] U.S. Cl. .................. 241/93; 144/34 R; 241/101.7; 241/242; 241/281; 241/292.1
[51] Int. Cl.² .................. B02C 18/22; B02C 21/02
[58] Field of Search .................. 144/2 N, 34 R; 241/101.7, 93, 278 R, 278 A, 280, 281, 292.1, 242

[56] References Cited
UNITED STATES PATENTS

| | | | |
|---|---|---|---|
| 332,854 | 12/1885 | Woods | 241/277 |
| 1,736,858 | 11/1929 | Merkel | 241/281 |
| 2,710,635 | 6/1955 | Alexander | 241/93 X |
| 3,209,801 | 10/1965 | Little et al. | 241/281 X |
| 3,682,210 | 8/1972 | Landers et al. | 144/34 R X |

Primary Examiner—Roy Lake
Assistant Examiner—E. F. Desmond
Attorney, Agent, or Firm—Bucknam and Archer

[57] ABSTRACT

A cutting machine for cutting ligneous materials into small pieces comprises a toothed cutting cylinder and a reaction member. In a mobile version of the machine the reaction member is in the form of a toothed felling cylinder 14, which is tangentially mounted with the cutting cylinder within a frame. The cutting and felling cylinders are coupled to a mechanism for driving them in rotation in such manner that their angular speeds are equal. The number of cutter blades carries by the cutting cylinder is equal to, or an integral multiple of, the number of teeth on the felling cylinder. The frame is mounted on a vehicle chassis so as to be rotatable relative thereto about two axes at right angles to each other. Jacks are provided for orientating the frame relative to the chassis which itself is tiltable by jacks with respect to a driving undercarriage.

17 Claims, 12 Drawing Figures

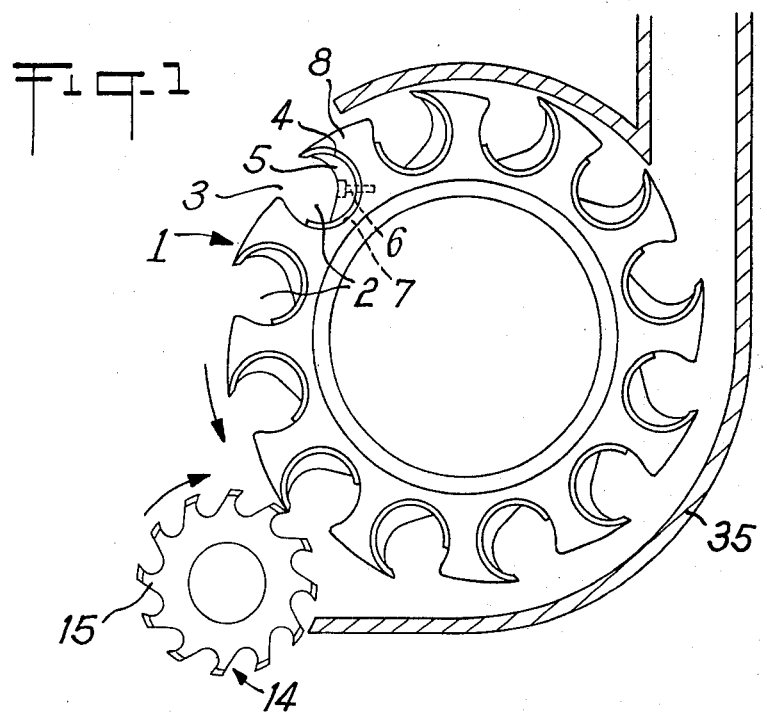
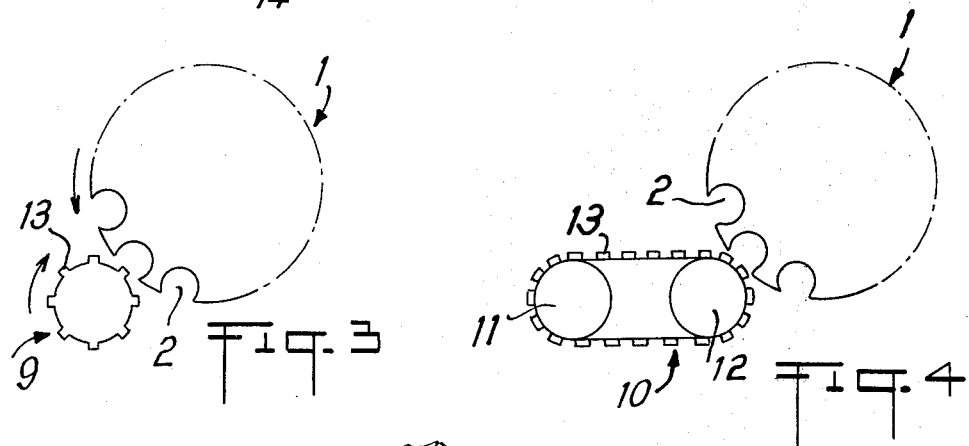
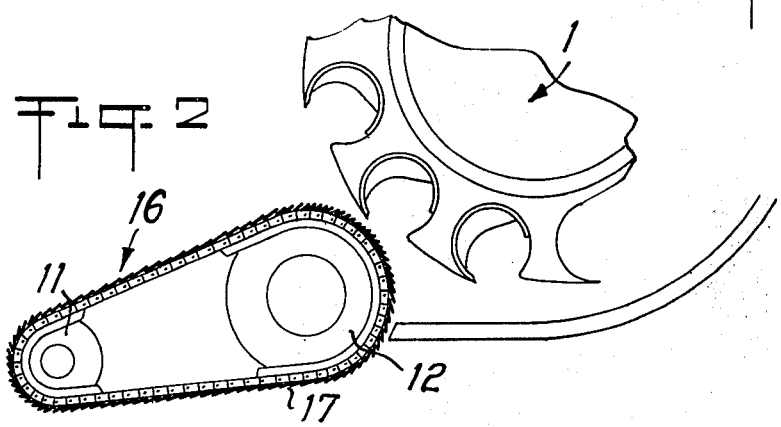

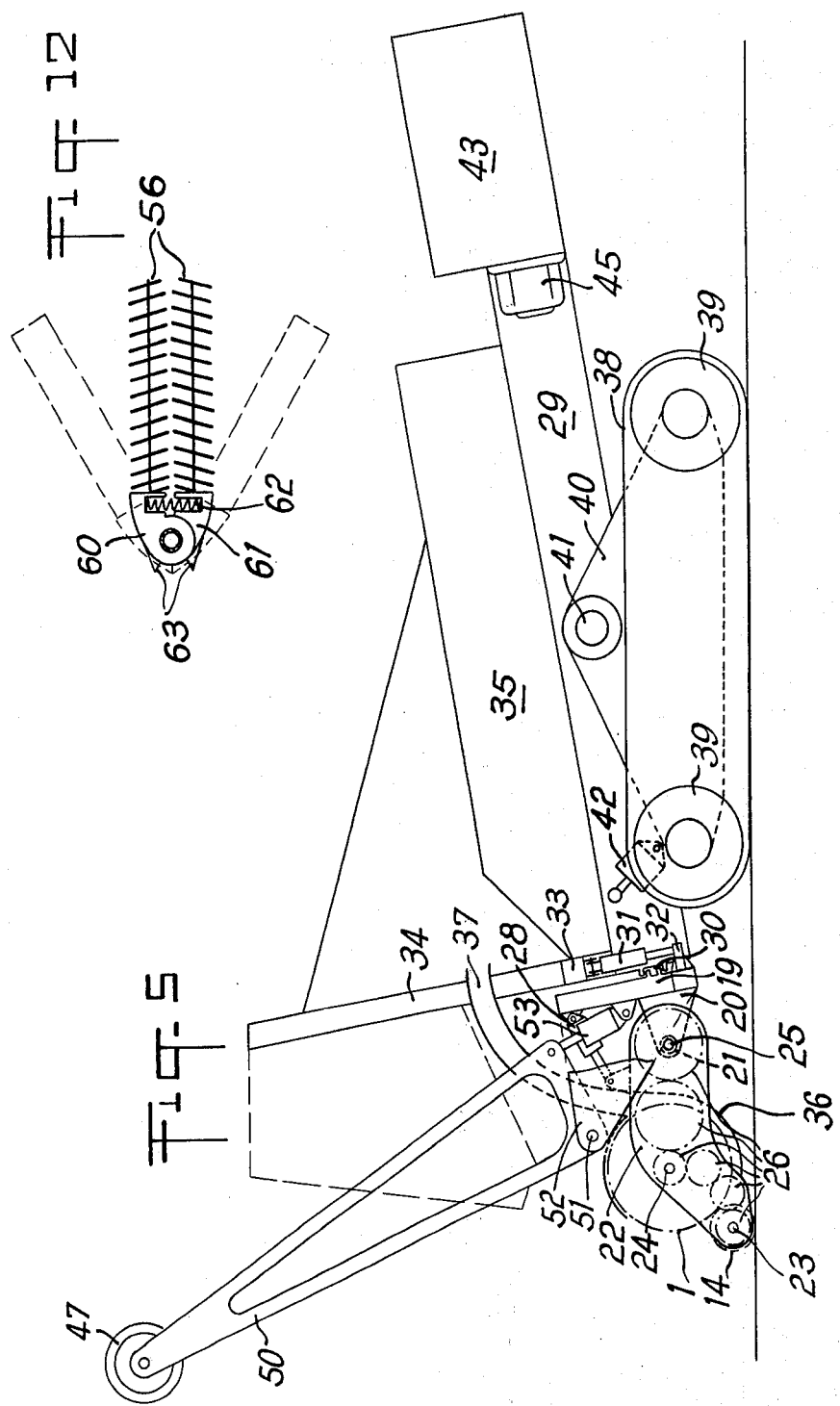

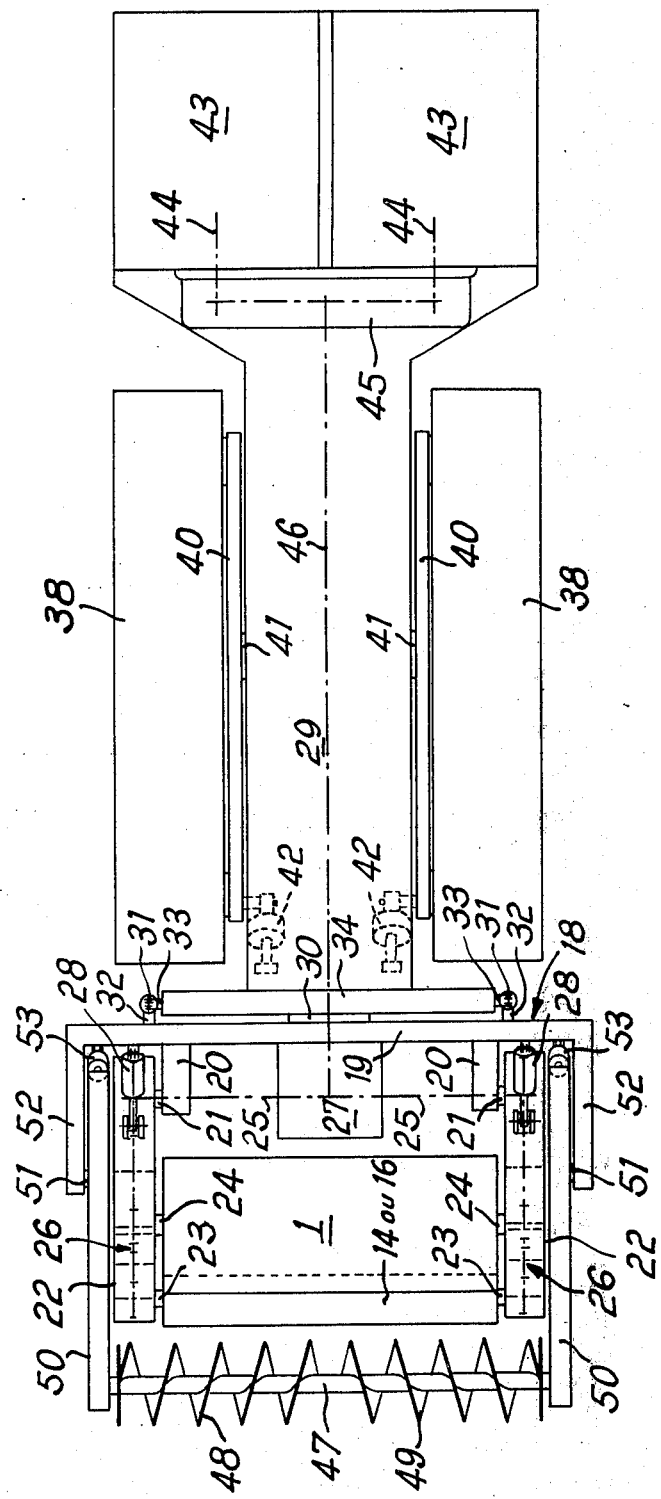

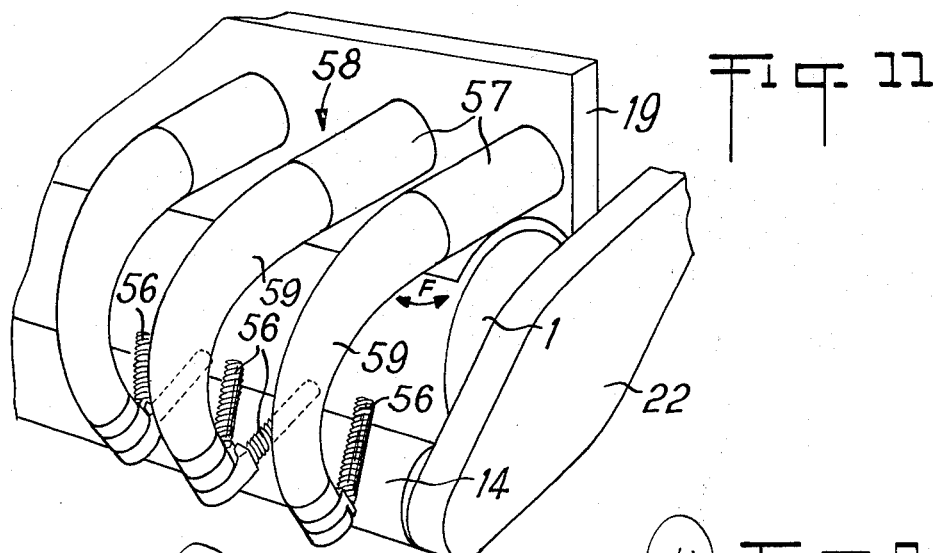

MACHINES FOR CUTTING WOOD AND OTHER LIGNEOUS MATERIALS INTO SMALL PIECES

BACKGROUND OF THE INVENTION

1. Field of the Invention

The present invention relates to machines for cutting wood or other ligneous materials such as sugar cane, into slabs, chips and other small pieces and more particularly to machines in the form of cutting installations or to mobile machines which effect in addition to the cutting operation, felling or hewing down of woody plants or other vegetation (for example brushwood vegetation) and levelling of stumps or stalks on the ground.

2. Description of the Prior Art

A previously proposed cutting machine comprises two cylinders carrying cutters arranged tangentially and turning at the same circumferential speed. These cylinders co-operate with each other and act in such a manner that either cylinder may act as the cutting member with the other cylinder providing a reaction member.

Such a machine is disadvantageous in that it produces small slabs of "herringbone" shape which are greatly compressed so that if not completely unusable, they are at least unsuitable for proper and efficient production of paper, boards or agglomerate, and similar ligneous material-based articles.

It is an object of the invention to provide an improved cutting machine.

SUMMARY OF THE INVENTION

According to the invention there is provided in a cutting machine for cutting ligneous materials into small pieces: a cutting cylinder rotatable about an axis and having a periphery with longitudinal recesses defined therein, the cutting cylinder comprising cutter blades with cutting edges, mounted in respective said recesses, the said recesses each defining a cavity for pieces cut off a workpiece by the cutter blades, a reaction member having a working surface drivable around a closed path, a portion of the working surface being disposed adjacent to the cutting cylinder and being of a part circular form, and means governing the relative speeds of the cutting cylinder and the working surface such that the tangential speed of the cutting cylinder is higher than the speed of the working surface, the ratio between these speeds being constant whereby the length of the slabs cut is substantially constant.

BRIEF DESCRIPTION OF THE DRAWINGS

Various forms of a cutting machine embodying the invention and for cutting ligneous materials into small slabs, will now be particularly described, by way of example, with reference to the accompanying diagrammatic drawings in which:

FIG. 1 is a cross-section of a first form of cutting assembly of the cutting machine;

FIG. 2 is a fragmentary elevation corresponding to FIG. 1, of a second form of cutting assembly;

FIGS. 3 and 4 are views, corresponding to FIG. 1, showing various forms of the cutting assembly;

FIG. 5 is an elevation of a self-propelled, cross-country, form of the cutting machine, suitable for felling and cutting purposes;

FIG. 6 is a plan view from above the cutting machine shown in FIG. 5;

FIGS. 7 to 10 illustrate the action of a mechanism of the cutting machine of FIG. 5;

FIG. 11 is a fragmentary perspective view of a feed screw device of the cutting machine of FIG. 5; and FIG. 12 is a plan view of two feed screws of the feed screw device of FIG. 11, illustrating the operation of the two feed screws.

DESCRIPTION OF THE PREFERRED EMBODIMENTS

The cutting machines shown in the drawings each comprise a rotatable cutting cylinder 1 (FIGS. 1 to 4) having recesses 2 spaced around its circumference, which are preferably cylindrical and are so arranged as to form a plurality of relatively wide slots 3 in the periphery of the cylinder 1 through which small slabs cut by the cutting machine can be discharged from the recesses 2 by centrifugal force. A cutter blade 4 of open tubular form is mounted in each recess 2. The radius of external curvature of each blade 4 is slightly greater than the radius of curvature of the corresponding recess. The blades are held in contact with the walls of the recesses by means of rigid blade-backing elements 5 whose external surfaces are shaped to complement the shape of the recesses. Bolts 6 press the elements 5 against the blades 4 to elastically deform the blades to the shape of their corresponding recesses and to firmly secure the blades in position on the cylinder 1. The bolts 6 pass through transverse openings 7 of the blades 4 in such manner that the blades can be adjusted to re-set their cutting position after a sharpening operation. Between adjacent recesses 2 are tooth-like projections of the cutting cylinder 1. The portion of each of these projections, which portion precedes a said recess with respect to the direction of working rotation of the cylinder, forms a heel 8.

Whatever the exact form of cutter blade employed, the sharpening of a cutting edge of each blade, the setting of its angle of cut and the determination of the clearance angle of the heel 8 preceding the blade, are such with respect to the tangent to the cylinder at the corresponding points, as to obtain the best conditions for oblique cutting of a workpiece fed tangentially toward the cylinder 1 at a smaller speed than the circumferential speed of the cylinder 1.

For a machine intended solely for the cutting up of wood or other ligneous materials, the cutting cylinder 1 (FIGS. 3 to 4), co-operates with a reaction member which may be either a cylinder 9 (FIGS. 3) or an endless belt 10 (FIG. 4) which can, for example, be formed by chains installed in juxtaposition and entrained around two toothed cylinders 11 and 12.

The cylinder 9 or the part of the belt 10 passing around the cylinder 12 forms the reaction member which in operation of the machine travels continuously along a path circular and tangential to the cutting cylinder, at least over its portion immediately adjacent the cylinder 1. The cylinders 9 and 12 are drivingly coupled to the cutting cylinder 1 such that their peripheral linear velocities are lower than that of the cylinder 1 although having the same direction.

With such an arrangement, the reaction member 9 or 10 feeds wood under the cutter blade 4 of the cutting cylinder 1 and thrusts the wood against the blades. However, due to the substantial difference in peripheral speeds between the reaction member and the cutting cylinder, the blades of the cylinder cut off small slabs of wood and there exists upstream of the blade actually cutting, a wood-retaining action which makes it possible to avoid compression of the small slabs. These slabs after being cut off enter the associated recess and are then discharged by centrifugal force through the corresponding slot 3 after passing along the cylindrical surface of the recess.

The ratio between the diameters of the cylinders 1 and 9 or 1 and 12, and the drive coupling transmission ratio to these cylinders, are set as a function of the desired length of the small slabs to be cut off.

The reaction member advantageously comprises projecting elements 13 which assist in the grasping and entrainment of wood. The projecting elements 13 may consist of studs or bars of rectilinear, helical, chevron or other suitable shape.

Where the cutting machine is of the mobile form, intended not only for cutting up wood into small slabs but equally for felling in the field, the cutting cylinder 1 (FIGS. 1 and 2) co-operates with a reaction member of the same type as described with reference to FIGS. 3 and 4 but which enables felling. This reaction and felling member can be either a cylinder 14 (FIG. 1) comprising cutting teeth 15, or an endless belt (FIG. 2) having chain links equipped with teeth 17.

The cylinder 14 or the belt 16 are positioned relative to the cutting cylinder 1 and are drivingly coupled thereto in the manner previously described with reference to FIGS. 3 and 4 with the exception that the angular speed of the cutting cylinder 1 is made equal to that of the cylinder 14 or of the cylinder 12 of the belt 16. The teeth 15 or 17 are arranged to form - preferably with their heels - reaction elements which co-operate with the cutter blades 4, and to achieve this at least some of the teeth 15 or 17 and some of the blades 5 are arranged to be in alignment in the area in which the wood is cut into small slabs, that is the machine cutting area. In other words, the number of cutter blades 4 is made equal to, or an integral multiple of, the number of teeth 15, or of the number of teeth 17 which would be present on the belt 17 if it were wound only around the cylinder 12, that is the pitch of the blades 4 is made equal to or an integral multiple of the pitch of the teeth 15 or 17; additionally, the cutting cylinder 1 and the cylinder 14 or belt 16 are angularly keyed with respect to each other such that a blade 4 is aligned with or positioned slightly behind a tooth 15 or 17 in the machine cutting area.

The teeth 15 and 17 are contoured such as to cut chips from a tree or other vegetation thereby forming a notch in the base of the tree and eventually felling the tree, the notch formed in the base of the tree being continually enlarged as felling progresses. The teeth 15 or 17 can be of rectilinear, helical, chevron or other suitable shape.

A more detailed description of a mobile form of the cutting machine suitable for felling or cutting vegetation, preferably brushwood, will now be given.

As shown in FIGS. 5 and 6, the cutting machine comprises a supporting frame 18 comprising a crosspiece 19 carrying two plates 20 each having a tubular journal 21, pivotally supporting respective box-section members 22. These members 22 together carry the cutting cylinder 1 and the reaction and felling member 14 or 16, which are arranged with their axes parallel to each other and substantially co-tangentially. A drive shaft 23 of the member 14 or 16 and a drive shaft 24 of the cutting cylinder 1 are drivingly coupled to each other and to an input shaft 25 (FIG. 6) by means of transmission gears 26 housed in each of the box-section members 22 (FIG. 5). The shaft 25 comprises two half shafts passing into their respective members 22 coaxially through respective said journals 21 and both coupled to a transfer box 27. Respective lifting jacks 28 are interposed between each box-section member 22 and the cross-member 19 and are operable to raise or lower the cutting cylinder 1 and the felling member 14 or 16 about a central position corresponding to the desired operating position of the cylinder 1 and member 14 or 16 on horizontal ground. In this central position, the downward slope of the common plane of the shafts 23 and 24 toward the shaft 23, that is in a forward direction, is sufficient to ensure that the felling member 14 or 16 will cut away vegetation at a lower level than the bottom of the cutting cylinder 1, thereby levelling stumps while at the same time felling vegetation and feeding it to the cutting cylinder 1. The cylinder 1 will cut the vegetation fed to it and discharge the vegetation in the form of small slabs and is, at the same time, safe from the risk of striking the ground. Operation of the jacks 28 enables the angle of the common plane of the shafts to be altered so that the felling member 14 or 16 continue to level stumps whether the ground on which the machine is operating slopes upwards or downwards.

The cross-beam 19 is carried by a chassis 29 of a tractor vehicle of the cutting machine, and is mounted in a bearing 30 whose axis is at right angles to that of the bearings 21 and consequently also of right angles to the axes of the cylinder 1 and of the member 14 or 16. Transverse tipping jacks 31 are arranged between respective blocks 32, integral with the cross-beam 19 adjacent respective extremities thereof, and respective blocks 33, integral with respective upright side members 34 of the chassis 29 at the lateral extremities thereof.

If the ground on which the machine is operating is horizontal, the jacks 31 are maintained in a central position. However, if the ground slopes laterally at the point of operation of the felling member 14 or 16, an inclination is imparted to the cross-beam 19 by extending the jack 31 situated on the downhill side of the machine. The cross-beam 19 is thereby tilted with respect to the chassis 29 in order to be parallel to the ground.

The chassis 29 of the tractor vehicle is relatively long and carries a container 35 (FIG. 6) into which are fed the small slabs cut off by the cutting cylinder 1. The slabs are delivered from the cylinder 1 to the container 35 through a duct system comprising an enclosing case 36 (FIGS. 1 and 5) and a rearwardly curving duct 37.

The tractor vehicle of the cutting machine comprises a driving undercarriage making it possible not only to exert a forward thrust on the felling and cutting assembly comprising the members 1 and 14 or 16, but also to reverse and to turn the vehicle. In the embodiment shown, this undercarriage comprises two caterpillar tracks 38 disposed on respective sides of the chassis 29; alternatively, or additionally, the undercarriage can be mounted on wheels. Driving wheels 39 for driving each caterpillar track are mounted on a bearer 40 which is journalled around a spindle 41 of of the chassis 29. Each spindle 41 is arranged parallel to the axis of the cutting cylinder 1 and extends through or adjacent the centre of gravity of the fully loaded chassis. Each bearer 40 is connected to the chassis 29 by means of a jack 42.

Operation of the jacks 42 enables the chassis 29 to be inclined to a greater or lesser degree with respect to the ground in the area of the caterpillar tracks 38. After the felling and cutting assembly has been appropriately adjusted by means of the jacks 28 or 31, this assembly is positioned in front of brushwood to be felled in the best position for felling or levelling by operation of the jacks 42.

At its end remote from the felling and cutting assembly, the chassis 29 carries two engines 43 whose output shafts 44 drive a common shaft 46 through a reduction gearbox 45. The shaft 46 is connected to the transfer box 27. The weight and position of the engines 45 with respect to the spindles 41, results in the engines balancing the felling and cutting assembly together with its supporting frame 18, its driving mechanism and its other associated members to be described hereinafter.

The cutting machine can comprise an auxiliary screw mechanism 47 for exerting a thrust on, and concentrating, vegetation situated above the felling and cutting assembly (FIGS. 5 to 10). The screw mechanism 47 is motorised and comprises two threads 48,49 of opposite hand so arranged that they tend to move stalks and stems of the vegetation closer to the centre of the screw mechanism. This screw mechanism 47 is rotatably carried by two upright jib members 50 pivoted about respective spindles 51 for rotation with respect to respective plates 52 integral with and extending perpendicular to, the cross-beam 19. Each jib member is connected to the cross-beam 19 by means of a respective tilting jack 53. The screw mechanism 47 is coupled to a driving device, not illustrated in the drawings, but which can, for example, be a directly coupled motor-reduction gear unit, or a transmission gear arrangement driven from the transfer box 27.

As illustrated in FIGS. 7 and 8, in operation of the cutting machine the screw mechanism 47, is advanced to brushwood 54 by pivoting the jib members 50 by the action of the jacks 53. The mechanism 47 operates to bring the trunks and branches of the brushwood 54 closer to the middle of the mechanism to form a bundle. At the same time, the felling member 14 acts on the base of the trunks close to the ground. As is shown in FIG. 9, the forward pivoting of the jib members 50 is continued which causes the top of the brushwood to tip over forward, so that as and when the trunks are severed, the trunks will be fed base-first by the felling member 14 towards the cutting cylinder 1. The brushwood is thus felled, in a forward direction (FIG. 10), and then cut up into small slabs by the cutting cylinder 1, the member 14 acting as a reaction member at the same time as chopping and levelling the stump 55.

The mobile form of the cutting machine can also comprise feed screws (FIGS. 11 and 12) for concentrating and feeding vegetation to the felling member 14. These feed screws 56 are angled with respect to each other and extend in a generally rearward direction. The feed screws which are positioned approximately above the member 14 are floating and are resiliently biased to extend in respective directions. The feed screws lie in a plane passing through the axis of rotation of the cutting cylinder 1. The feed screws 56 are carried by support arms 58 which comprise fixed tubular parts 57 and respective downwardly curving pivotable parts 59. The parts 59 are integral with the cross-beam 19 and extend at right angles to the cutting cylinder 1. Each part 59 is free to change its directional setting as is indicated by the arrow F, under the action of the forces applied to it by the brushwood 54.

The lower extremity of each pivotable part 59 carries pivotally and in an overhung position either one screw 56 in the case of the two laterally extreme support arms 58, or two screws 56 in the case of the intermediate arms 58. In the latter case (FIG. 12), the feed screws 56 associated with each arm 58 are carried by elements 60 and 61 which are pivotally mounted one above the other on the lower extremity of the corresponding part 59. The parts 60 and 61 are thus free to pivot independently of each other; a spring 62 interposed between the elements 60 and 61 tends to spread the screws apart to a maximum angular spread which is determined by the mutual abutment of steps 63 respectively carried by the elements 60 and 61.

Each screw 56 is coupled to a driving device for rotating the screw. This drive can be, for example, either a direct-action motor-reduction gear unit or a flexible transmission system extending through the corresponding arm 58 to the transfer box 27 from which it is driven. Moreover, the running direction of the thread of the screws 56 and their directions of rotation are such that these screws tend to push vegetation rearwards whilst at the same time pressing it down for entrainment between the cutting cylinder 1 and the felling member 14.

The assembly of feed screws thus acts like a comb whose teeth are formed by the feed screws. These screws are sloping and are pivotally movable about two axes substantially at right angles to each other. The screws yield on impact with vegetation to grasp the vegetation without opposing its drag too strongly.

Various modifications can be made to the described mobile cutting machine, for example, the frame 18 supporting the assembly of the cutting cylinder and felling member 14 or 16 may be constructed in different manner, provided that it allows the various adjustments hereinbefore described to be carried out to make possible the attainment of an appropriate alignment of this assembly with respect to vegetation to be cut. The methods of actuation of the movable elements of the cutting machine can also be of another kind, for example, the jacks can be replaced by hydraulic or other motors arranged concentric with the pivoting axes of the movable elements. Similarly, the driving device of the cylinders 1 and 14 can also be constructed in different manner and can, for example, comprise at least one hydraulic motor housed within one or both cylinders.

The described cutting machine is primarily applicable for cutting up ligneous materials into small slabs usable in the paper industry, the agglomerate board industry, the sugar production industry and similar industries. The machine is also applicable for harvesting vegetation on the ground and more particularly for harvesting brushwood, sugar cane, and similar vegetation by felling the vegetation and cutting it up into small slabs.

The hereinbefore described cutting assembly, i.e. the cutting cylinder and reaction member, is advantageous in that it produces good quality small slabs at a very high output rate and with satisfactory power efficiency. The cutting assembly is suitable for delivering optional woodsand vegetation, has a low rate wear and is reliable over long periods.

The mobile form of the cutting machine offers the further advantages of engulfing all vegetation encountered automatically and at high speed, of clearing ground and levelling stumps. This form of the cutting machine is of particular use for harvesting brushwood.

I claim:

1. In a cutting machine for cutting ligneous materials into small pieces: a cutting cylinder rotatable about an axis and having a periphery with longitudinal recesses defined therein, the cutting cylinder comprising cutter blades with cutting edges, mounted in respective recesses, the said recesses each defining a cavity for pieces cut off a workpiece by the cutter blades, a reaction member having a working surface drivable around a closed path, a portion of the working surface being disposed adjacent to the cutting cylinder and being of a part circular form, and means governing the relative speeds of the cutting cylinder and the working surface such that the tangential speed of the cutting cylinder is higher than the speed of the working surface, the ratio between these speeds being constant whereby the length of the pieces cut is substantially constant, said reaction member being positioned in closely adjoining relation to the cutting cylinder to define therewith a curvilinear wedge shaped feed zone of decreasing size whereby substantially the entire reaction forces of cutting are applied between the cutting cylinder and reaction member.

2. A machine according to claim 1, wherein the said reaction member comprises
projecting elements, said elements being on the said working surface and facilitating grapsing and entrainment of ligneous material to be cut.

3. A machine according to claim 1, wherein the reaction member comprises
a cylinder, said cylinder being drivingly coupled to the cutting cylinder.

4. A machine according to claim 1, wherein the reaction member comprises
an endless belt, and
two cylinders, said belt being wound around said two cylinders, one of said cylinders being positioned adjacent to the cutting cylinder, and being drivingly coupled thereto.

5. In a cutting machine for cutting ligneous materials into small pieces:
a cutting cylinder rotatable about an axis and having a periphery with longitudinal recesses defined therein, the cutting cylinder comprising
cutter blades with cutting edges, mounted in respective recesses, the said recesses each defining a cavity for pieces cut off a workpiece by the cutter blades,
a reaction member having a working surface drivable around a closed path, a portion of the working surface being disposed adjacent to the cutting cylinder and being of a part circular form, and
means governing the relative speeds of the cutting cylinder and the working surface such that the tangential speed of the cutting cylinder is higher than the speed of the working surface, the ratio between these speeds being constant whereby the length of the pieces cut is substantially constant,
said reaction member including cutting teeth on said working surface for felling vegetation, said governing means governing the relative speeds of the cutting cylinder and said working surface such that the angular speed of said portion of the working surface is equal to the angular speed of the cutting cylinder.

6. A machine according to claim 5, wherein the number of said cutter blades of the cutting cylinder is equal to the number of said cutting teeth of the reaction member.

7. A machine according to claim 5, wherein the number of said cutter blades of the cutting cylinder is an integral multiple of the number of said cutting teeth of the reaction member.

8. A machine according to claim 5, wherein the cutting cylinder and the reaction member are so mutually orientated that at least some of the said cutter blades come into alignment with the said teeth on the said portion of the working surface.

9. A machine according to claim 5, wherein the cutting cylinder and the reaction member are so mutually orientated that at least some of the said cutter blades lag slightly behind the said teeth on the said portion of the working surface.

10. A machine according to claim 3, further comprising
a frame carrying the said cutting cylinder and the said reaction member,
a cross-country vehicle comprising
a driving undercarriage,
a vehicle chassis, mounted on the undercarriage, and
height adjusting means,
a supporting device connecting the said frame to the vehicle chassis and having
articulation means whereby the frame is articulated with respect to the two axes, one of said axes being parallel to and the other of said axes being at right angles to the said axis of rotation of the cutting cylinder, and
actuating devices actuable to cause independent pivoting of the frame about said one of said axes to adjust the angle of felling action of the reaction member with respect to the ground, and about the said other of said axes to adjust the lateral inclination of the reaction member with respect to the ground, the said height-adjusting means being operable to alter the position of the said chassis relative to the said undercarriage, whereby at least the said frame is adjustable in height with respect to the driving undercarriage.

11. A machine according to claim 10, wherein the chassis of the vehicle has a front and a rear section and is pivotally mounted on the driving undercarriage about an axis at right angles to the direction of vehicle movement and substantially parallel to the said axis of rotation of the cutting cylinder, the supporting device and the said actuation devices being mounted on the front section of the chasses, said machine further comprising
a drive unit for the cutting cylinder and the reaction member, said unit being mounted on the rear section of the chassis to act as a counter-balance weight.

12. A machine according to claim 11, wherein the frame comprises
two lateral box-section members between which the cutting cylinder and reaction member are mounted for suport thereby, the supporting device comprises
a cross-beam,
two bearings mounted on the cross-beam and aligned parallel to the axis of rotation of the cutting cylinder, the said two bearings forming part of the said articulation means, the two lateral box-section members being mounted in respective said bearings, lifting jacks respectively connecting the box-section members to the cross-beam and operable to raise and lower the said frame, a further bearing disposed centrally with respect to, and supporting, the cross-beam for rotation about the said other of said axes, the said further bearing forming part of the said articulation means, and tilting jacks connecting the said vehicle chassis to the cross-beam and operable to rotate the cross-beam about the said other axis, the governing means comprises a first drive coupling mechanism for the cutting cylinder and reaction member, said mechanism being carried by the box sections, the machine further comprising a second drive coupling mechanism drivingly coupling the said first mechanism with the said drive unit, the said second mechanism passing through the said bearings carried by the box-section members and through the said bearing supporting the cross-beam.

13. A machine according to claim 3, further comprising a screw mechanism for concentrating vegetation, said screw mechanism comprising two threaded shafts of opposite hand, said shafts being coaxial and joined together, support means supporting the two threaded shafts above the assembly formed by the cutting cylinder and the reaction member, drive means driving the threaded shafts in a direction such that vegetation engaged by each threaded shaft is moved towards the other said shaft, and means for displacing the said support means to move the said screw mechanism substantially parallel to the cutting cylinder.

14. A machine according to claim 13, wherein the said support means comprises two jib members between which the threaded shafts are rotatably mounted, each said jib member being journalled on said cross-beam about an axis substantially parallel to the axis of rotation of the cutting cylinder, the said means for displacing the support means being mounted on the cross-beam.

15. A machine according to claim 3, further comprising a feed screw device for concentrating and the feeding vegetation to the reaction member, said feed screw device comprising at least two feed screws, feed screw support means, said support means comprising at least one support arm mounted on the cross-beam, the said feed screws being floatingly mounted on said support means above the reaction member to project rearwardly with respect to the machine in a plane passing substantially through the axis of rotation of the cutting cylinder, the feed screws being resiliently biased toward respective preferred directions within this plane, and drive means driving the feed screws in such rotational senses that they tend to push vegetation rearwards whilst holding it down.

16. A machine according to claim 15, wherein the feed screw device comprises a plurality of said support arms, said arms being laterally spaced, the two outer arms each carrying one said feed screw, and the other arms carrying respective pairs of said feed screws, each support arm comprising a fixed part projecting from the cross-beam at right angles to the axis of rotation of the cutting cylinder, and a pivotal part extending downwards from the fixed part and having a lower extremity, each screw of each said pair of feed screws being mounted on the lower extremity of the pivotal part of the corresponding support arm, and being pivotal independently of the other screw of that pair about an axis at right angles to their common plane, the said drive means comprising transmission gear systems extending through each support arm.

17. A machine according to claim 16, wherein the feed screw device further comprises resilient means for each said pair of feed screws, the said resilient means being interposed the screws to bias the screws apart.

* * * * *